United States Patent [19]
Stevens et al.

[11] Patent Number: 5,940,264
[45] Date of Patent: *Aug. 17, 1999

[54] ELECTROLYTIC CAPACITOR WITH HEAT SINK AND METHOD OF HEAT DISSIPATION

[75] Inventors: James L. Stevens, Irmo; John D. Sauer, Columbia, both of S.C.

[73] Assignee: Philips Electronics North America Corp, New York, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/726,285

[22] Filed: Oct. 4, 1996

[51] Int. Cl.$^6$ ...................................................... H01G 2/08
[52] U.S. Cl. ........................... 361/514; 361/709; 257/706
[58] Field of Search ................... 361/709–711, 717–722, 361/513–514; 257/706–707, 712–713, 720; 29/25.03

[56] References Cited

FOREIGN PATENT DOCUMENTS

| 9212421 | 3/1994 | Germany | .......................... H01G 1/08 |
| 403248514 | 11/1991 | Japan . | |

*Primary Examiner*—Kristine Kincaid
*Assistant Examiner*—Anthony Dinkins
*Attorney, Agent, or Firm*—Daniel E. Tierney

[57] ABSTRACT

The invention provides a method of constructing an electrolytic capacitor with a heat sink, which includes attaching a surface area of the heat sink in intimate contact with a surface area of the capacitor. The invention also provides a method of constructing an electrolytic capacitor with a heat sink which includes the steps of (i) selecting a surface area of the electrolytic capacitor and a surface area of the heat sink for intimate contact, and (ii) attaching the surface area of the heat sink in intimate contact with and the surface area of the electrolytic capacitor. Moreover, the invention provides for an electrolytic capacitor constructed in accordance with the methods described above and also for a device including an electrolytic capacitor having a surface area in intimate contact with a surface area of a heat sink.

7 Claims, 2 Drawing Sheets

ELECTROLYTIC CAPACITOR WITH HEAT SINK AND METHOD OF HEAT DISSIPATION

BACKGROUND OF THE INVENTION

This invention pertains generally to the field of electrolytic capacitors ("elcaps") and to the construction of such capacitors in order to improve their heat dissipating properties.

Generally, choosing appropriate materials for the manufacture of the capacitors or heat sinks, treatment methods for improving the efficiency of heat sinks, techniques for mountings capacitors or heat sinks to a chassis or frame, and the selection of appropriate insulation pads, etc. are known or readily determinable by those skilled in the art. Attention is directed to the appropriate texts and references known to those skilled in the art for details regarding these and other concepts. See e.g., *Electrolytic Capacitors*, by Paul McKnight Deeley (The Cornell-Dubilier Elec. Corp., S. Plainfield, N.J., 1938).

An electrolytic capacitor generates internal heat due to fluctuating current ("ripple current") during operation. This necessitates a design for the capacitor which will conduct heat from the core of the capacitor to the outside environment. For cylindrical elcaps, radial and axial heat flow serves to conduct the heat from the core of the capacitor to the sides and bottom of the package in which the capacitor is encased. Dissipation of the heat from the package of the capacitor to the outside environment is limited by the external thermal resistance between the package and the ambient air.

If the package (or "can") surface area is made larger without impeding heat flows from the roll to the can, then the capacitor dissipates more heat and thus handles more ripple current. Capacitors should be made in as small a can as possible to achieve more efficient heat flow from the roll to the can. Low height to diameter ratios are desirable, where feasible, to take advantage of high axial heat flow. However, low height seriously degrades surface area to volume ratio, thus raising thermal resistances.

Other techniques for conducting heat from the core of an electrolytic capacitor to its package with improved efficiency are known. For instance, U.S. Pat. No. 4,546,415 describes features for conducting heat from the core of the capacitor to the package. Capacitors so constructed would appear to have lower internal thermal resistance and higher heat transfer rate from their cores to the package than that of standard electrolytic capacitors. U.S. Pat. No. 4,546,415 is hereby incorporated by reference into the present disclosure.

Various constructions of heat sinks, and techniques for improving their thermal efficiency, are known. Heat sinks made of aluminum, for example, are known in the art. Heat sinks are often finned to increase their surface area. The heat dissipating ability of a heat sink can be improved by using different length of finned stock or by the application of special coatings that are common in the heat sink industry, e.g., black anodizing. Another technique, for increasing the overall heat transfer rate from a heat sink, includes providing means of circulating a cooling fluid or gas through or around a heat sink.

Heat sinking can increase the dissipation of heat from the package of an electrolytic capacitor to the surrounding environment. Prior art attempts for dissipating the heat from the package have used radial type heat sinks surrounding the circumferential or peripheral surface of the package. Such arrangements, however, have not provided significant increase in thermal dissipation. Such arrangements also increase the "footprint" of the capacitors (i.e., the extent of the radial cross-sectional area of the capacitor), thus decreasing the available horizontal space in the equipment cabinet.

Other prior art devices have included a bolt at the insulated bottom of the capacitor package, to which a heat sink may be mounted. However, this arrangement has also not provided a significant increase in thermal dissipation.

SUMMARY OF THE INVENTION

It has been discovered that the lack of intimate contact between the package of an electrolytic capacitor and an externally mounted heat sink because of an insulator, the presence of microscopic air gaps and/or other thermal impediments, destroys the effectiveness of the added area of the heat sink and its ability to dissipate heat from the package. The presence of air gaps, insulation and/or other thermal barrier between the package and heat sink creates thermal resistances in series, through which the heat must dissipate.

Thus, it has been discovered that the prior attempts to mount heat sinks to electrolytic capacitors have not provided significant improvement in thermal dissipation because of the presence of a layer of insulation, microscopic air gaps and/or other thermal impediment between the capacitor and the heat sink.

Accordingly, it is an object of the present invention to provide means for constructing electrolytic capacitors, particularly aluminum electrolytic capacitors, in a manner that eliminates or minimizes the thermal resistance between the external surface of a capacitor's package and an external heat sink. It is also an object of the present invention to provide an electrolytic capacitor and heat sink combination in which the surface area of the package is not obscured by the attachment of the heat sink. Further, it is an object of the invention to provide an electrolytic capacitor/heat sink combination which minimizes the "footprint" of the capacitor. By ultimately increasing the capacitor's effective ability to dissipate heat, it is also an objective of the present invention to increase the ripple current handling capability of the device.

The present invention provides a method and apparatus for reducing or eliminating the large thermal resistance between the external heat sink and the surface of the package, thus increasing the efficiency of the heat transfer from the package to the external heat sink, and ultimately to the ambient air environment. The method comprises the mounting of the external heat sink in a manner to ensure intimate thermal contact between a surface area of the heat sink and a surface area of the package of the capacitor. In a preferred embodiment, the intimate thermal contact between the surface area of the external heat sink and the surface area of the capacitor package is effected by the use of a thermally-conductive adherent, such as mastic or epoxy, in an amount sufficient to fill any microscopic air gaps between the surface areas. Additionally, it is advantageous to mount the heat sink (preferably an axial cylindrical heat sink) to the flat bottom surface of the capacitor's package without the interposition of electrical insulation normally used on capacitors.

The invention also provides a method of constructing an electrolytic capacitor with a heat sink, which comprises attaching a surface area of the heat sink in intimate contact with a surface area of the capacitor. The invention also provides a method of constructing an electrolytic capacitor with a heat sink which comprises the steps of (i) selecting a surface area of the electrolytic capacitor and a surface area of the heat sink for intimate contact, and (ii) attaching the surface area of the heat sink in intimate contact with the surface area of the electrolytic capacitor. Moreover, the invention provides for an electrolytic capacitor constructed in accordance with the methods described above and also for a device comprising an electrolytic capacitor having a surface area in intimate contact with a surface area of a heat sink.

DETAILED DESCRIPTION OF THE INVENTION

Figure 1:
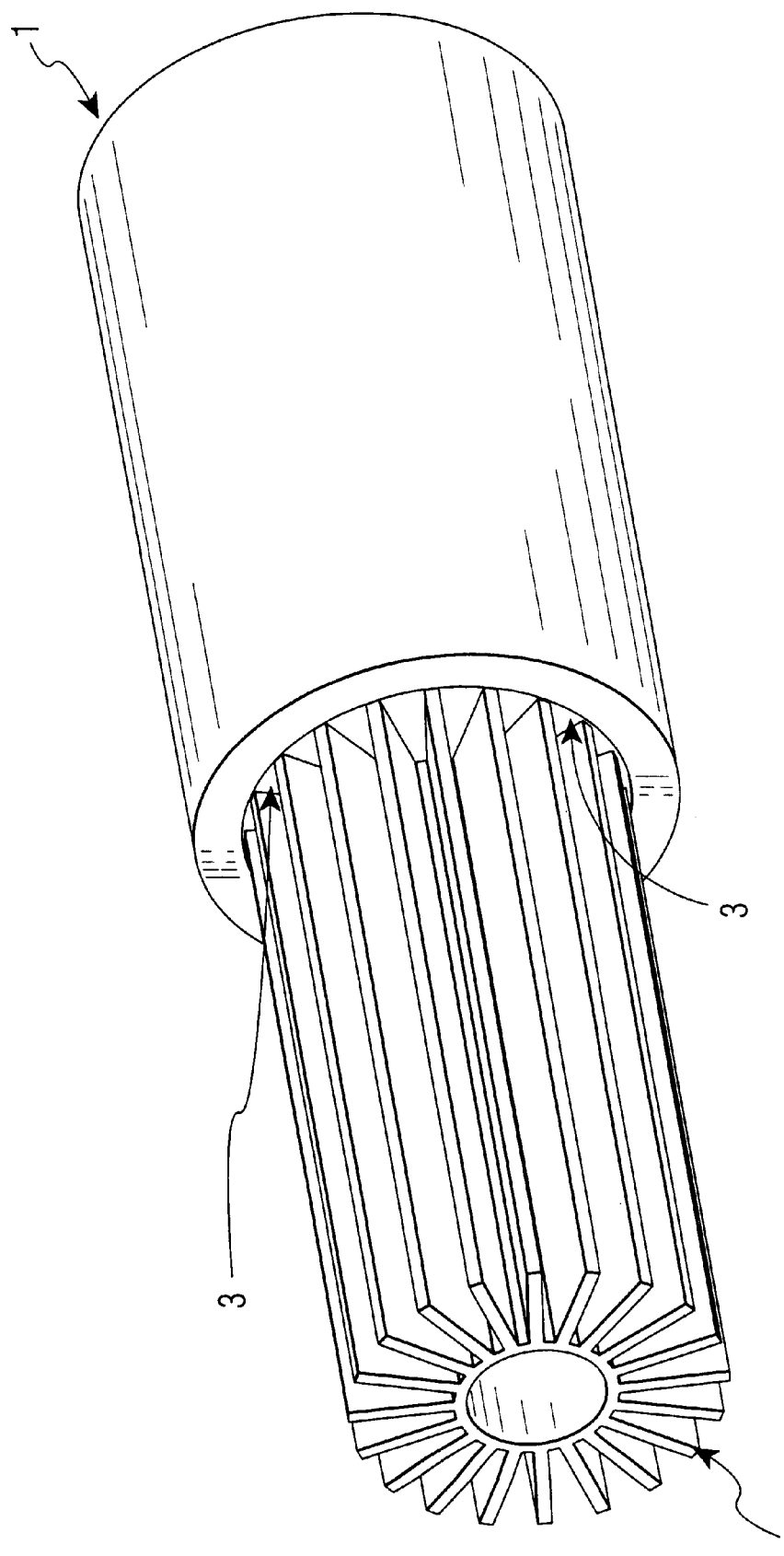
FIG. 1—is a perspective view of an electrolytic capacitor with an axial heat sink of the present invention.
Figure 2:
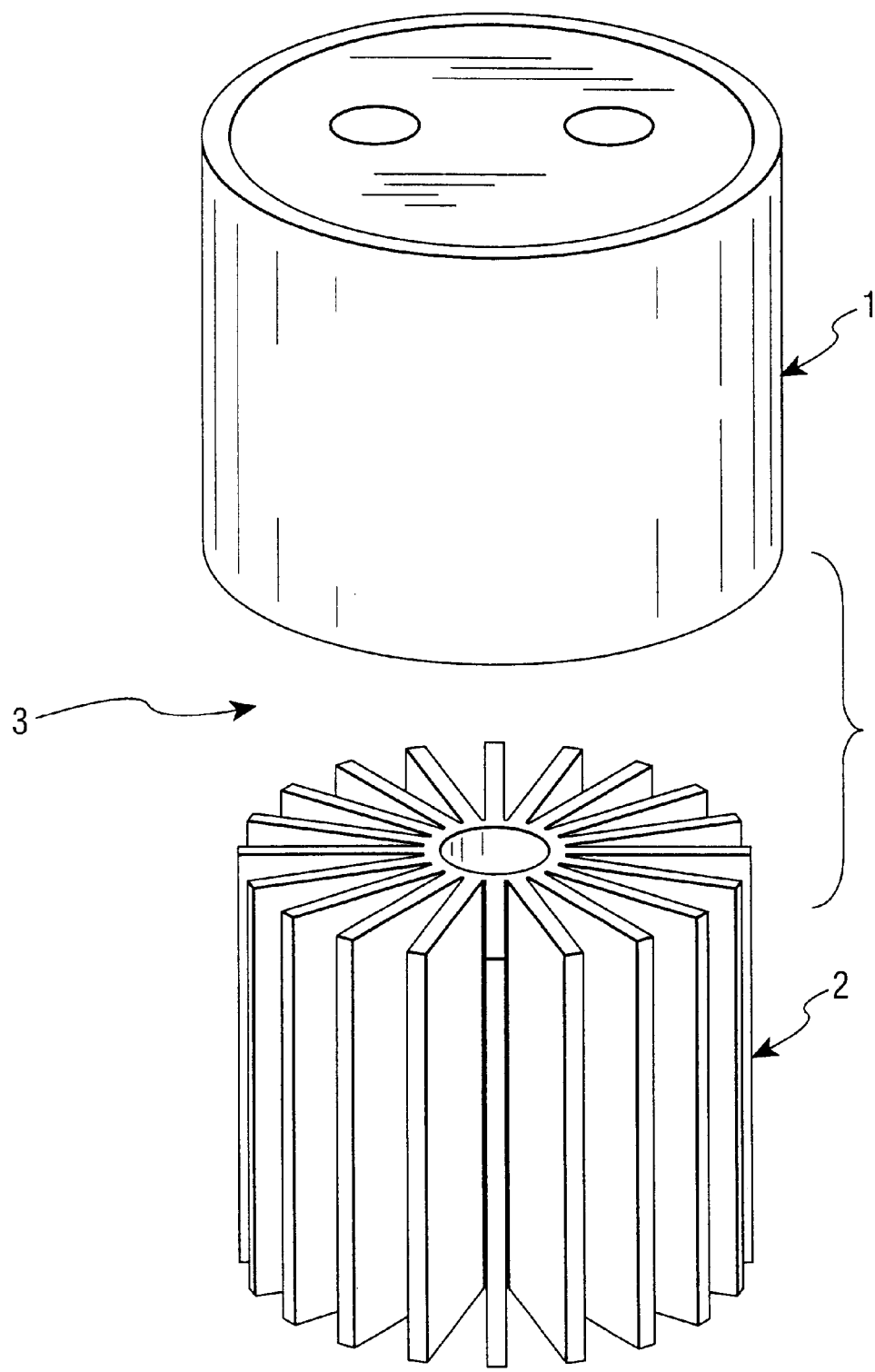
FIG. 2—is a perspective, exploded view of the electrolytic capacitor with an axial heat sink of FIG. 1.

Referring to FIGS. 1 and 2, an axial, cylindrical, finned heat sink 2 is shown attached to an area on the bottom surface of a cylindrical electrolytic capacitor 1. (FIG. 2 shows the heat sink 2 exploded away from the bottom of the capacitor 1.) The interface 3 permits intimate contact between the heat sink and the capacitor's bottom surface. Preferably, a thermally conductive adhesive or adherent (e.g., epoxy or mastic) is deposited at the interface 3 to fill air gaps between the heat sink and the capacitor's bottom surface and to secure attachment. The use of an axial configuration for the heat sink as shown in the figures is also quite beneficial in that it allows maintenance of the same "footprint" for the electrolytic capacitor, thus preserving horizontal space in the equipment cabinet.

In the practice of the present invention, any surface of the capacitor may be used for attachment of the heat sink as long as significant thermal connection ("intimate contact") between a surface of the capacitor and heat sink can be obtained. Although the top surface, the circumferential or peripheral surface, and the bottom surface of the capacitor may all be used for the attachment of a heat sink, it is preferred to use a flat surface such as the bottom or top of the capacitor. Since the top is usually made of an insulating material, the bottom is preferred. In general, it is easier to obtain intimate contact with a flat surface of the capacitor than with the circumferential or peripheral surface. In the most preferred embodiment of the invention, the heat sink is attached to the bottom surface of the capacitor, without a layer of insulation interposed between the sink and the capacitor. (If there is a layer of insulation surrounding the bottom of the capacitor, it is preferred that it is first removed. Electrical isolation of the capacitor with the mounted heat sink may then be achieved as described below.)

Preferably, the package of the elcap is made of aluminum and the heat sink used is an axial heat sink (axial with respect to the capacitor foil roll), such as an extended cylindrical heat sink with a large fin area (approximately 20–80 in$^2$/in.). Of course, other heat sinks with smaller fin areas and different configurations could also be used in the invention as long as the heat sink has a low thermal resistance.

Preferably, a thermally conductive media, such as thermally-conductive mastic or epoxy, is used to attach the heat sink to the surface of the capacitor. The mastic or epoxy is used in a manner and an amount sufficient to substantially fill microscopic air gaps between the surface of the capacitor and the heat sink, a source of thermal resistance. Thus, the mastic or epoxy enhances the intimate contact between the surface of the capacitor and the heat sink. It is contemplated that other attachment means, including mechanical fastening means, may also be used in the practice of the invention as long as intimate contact between the heat sink and the surface of the capacitor is achieved. For instance, the heat sink and the capacitor may be provided with threaded connections so that they bolt together. Additionally, a clip assembly around the periphery of the capacitor and heat sink may be used for attachment. By providing such a means of mechanical attachment, the air gaps at the interface may be reduced or eliminated with, for example, a non-adhering thermally conductive media, such as thermally conductive gel or grease. Of course, a thermally conductive mastic or epoxy may also be used.

In practicing the present invention, it is necessary to avoid the interposition of insulating barriers between the capacitor package surface and the heat sink, such as the plastic disks or sleeves normally placed on electrolytic capacitors for electrical insulation.

Even a thin 10 mil polymer disk can dramatically increase the thermal resistance between the heat sink and capacitor. In accordance with the present invention, interfacial thermal resistance between the heat sink and the surface of the capacitor should be minimized. Thus air gaps, insulators and other sources that impede intimate contact should be eliminated. Electrical insulation of the preferred capacitor/heat sink combination of the invention from other components and devices on a chassis or frame may be achieved, for example, by mounting the heat sink to the chassis or frame with an insulation pad underneath the heat sink and the use of an insulating bolt into a threaded core of the heat sink.

Experimental Results

Table I below shows the effect of eliminating insulating material between the heat sink and the capacitor, and using a thermally-conductive epoxy to enhance intimate contact. The capacitor used was a Philips' aluminum elcap, with part number 3186GH134T020. The heat sink used was aluminum, having a 2 inch diameter and 3 inch length. (The length of the heat sink was cut so that the effective surface area of the finned heat sink was approximately equivalent to the surface area of the package (approximately 60 in$_2$).) As seen from Table I, the cylindrical capacitor was vertically mounted, with the heat sink attached at the bottom. Horizontal air flow was provided around the can and heat sink because the can will normally block upward convection through the fins of the sink. (Air flow over the package can increase heat removal from the package: the package to ambient thermal resistance ($R_{hpa}$) may be reduced by a factor of 2 or 3). Without any heat sink, the package to ambient thermal resistance ($R_{hpa}$) was measured to be 0.6° C./W. When a heat sink was attached to the bottom of the can with a 10 mil mylar insulating disk interposed between the sink and the can, the $R_{hpa}$ was measured to be 0.4° C./W. When the heat sink was epoxied directly to the bottom of the can, the $R_{hpa}$ was reduced to 0.3° C./W.

TABLE I

| Test Description - All Vertical Mount | $R_{hpa}$[°C./watt] |
| --- | --- |
| Extended Cathode and Heavy Can Bottom @ 600 FPM air flow - no heat sink | 0.6 |
| Same Elcap @ 600 FPM air flow - insulating disk epoxied between the heat sink and can bottom | 0.4 |
| Same Elcap @ 600 FPM air flow - heat sink epoxied directly to can bottom | 0.3 |

These experimental results indicate that the interposed insulating layer effectively doubles the thermal resistance of the heat sink. By analogy to the model for electrical resistance, the $R_{hpa}$ of the heat sink epoxied directly to the bottom of the can may be calculated as follows:

$$R_{hpa} = \frac{(R_{hpa(can\ alone)})(R_{hpa(heat\ sink\ alone)})}{(R_{hpa(can\ alone)}) + (R_{hpa(heat\ sink\ alone)})}$$

Using the experimental results of Table I:

$$0.3 = \frac{(0.6)(R_{hpa(heat\ sink\ alone)})}{(0.6) + (R_{hpa(heat\ sink\ alone)})}$$

Solving, $$R_{hpa(heat\ sink\ alone)} = 0.6°\ C./W.$$

Similarly, the composite $R_{hpa}$ of the heat sink and the insulating disk epoxied to the bottom of the can may be calculated as follows:

$$R_{hpa} = \frac{(R_{hpa(can\ alone)})(R_{hpa(heat\ sink\ and\ disk)})}{(R_{hpa(can\ alone)}) + (R_{hpa(heat\ sink\ and\ disk)})}$$

Using the experimental results of Table I:

$$0.4 = \frac{(0.6)(R_{hpa(heat\ sink\ and\ disk)})}{(0.6) + (R_{hpa(heat\ sink\ and\ disk)})}$$

Solving, $$R_{hpa(heat\ sink\ and\ disk)} = 1.2°\ C./W.$$

Thus, the insulating disk effectively doubles the thermal resistance of the heat sink.

While the present invention has been described in conjunction with specific embodiments, it will be apparent to those skilled in the art that many alternatives, modifications, and variations are possible. For example, any thermally conductive media that can conform at the interface to substantially eliminate the air gaps may be used. For example, a thermally conductive gel bladder or pliable disk may be used. Accordingly, it is to be understood that the invention is not limited to the specific embodiments set forth herein but encompasses those alternatives, modifications, and variations which fall within the spirit and scope of the appended claims and their equivalents.

What is claimed is:

1. A method of constructing an aluminum electrolytic capacitor having a cylindrical configuration and bottom and top flat surface areas at least one of which is insulator free with a heat sink having a cylindrical configuration comprising attaching the heat sink to one of said surface areas of the capacitor in a manner such that corresponding surface areas of the capacitor and the heat sink are in intimate contact and longitudinal axes of the capacitor and the heat sink are essentially parallel.

2. A method of claim 1, wherein an insulator free surface area of the heat sink is attached to the bottom surface area of the capacitor.

3. A method of claim 1, wherein attaching the heat sink to the capacitor is effected by using a thermally-conductive adherent between the heat sink and the surface of the capacitor.

4. A method of claim 3, wherein the thermally-conductive adherent substantially fills air gaps between the surface area of the heat sink and the surface area of the capacitor.

5. A method of claim 3, wherein the adherent is a thermally-conductive epoxy.

6. A method of claim 1, wherein attaching the surface area of the heat sink to the surface area of the capacitor is effected by a mechanical fastener.

7. A method as claimed in claim 6, wherein a conformable thermally conductive media is disposed between the surface area of the heat sink and the surface area of the capacitor.

* * * * *